(12) United States Patent
Farrar

(10) Patent No.: US 6,425,215 B2
(45) Date of Patent: Jul. 30, 2002

(54) SACRIFICIAL SHIELD FOR WINDOW ASSEMBLY

(75) Inventor: Jerry L. Farrar, Banning, CA (US)

(73) Assignee: Transit Care, Inc., Murrieta, CA (US)

( * ) Notice: Subject to any disclaimer, the term of this patent is extended or adjusted under 35 U.S.C. 154(b) by 0 days.

(21) Appl. No.: 09/820,184

(22) Filed: Mar. 27, 2001

Related U.S. Application Data

(63) Continuation-in-part of application No. 09/395,692, filed on Sep. 13, 1999, which is a continuation-in-part of application No. 09/186,513, filed on Nov. 4, 1998, now Pat. No. 6,205,723.
(60) Provisional application No. 60/244,402, filed on Oct. 30, 2000.

(51) Int. Cl.[7] .................................................. B60J 1/10
(52) U.S. Cl. .......................... 52/204.5; 52/202; 52/208; 52/203; 296/146.15
(58) Field of Search ..................... 52/204.5; 296/146.15

(56) References Cited

U.S. PATENT DOCUMENTS

| | | |
|---|---|---|
| 1,533,731 A | 4/1925 | Foley |
| 1,828,515 A | 10/1931 | Stone |
| 1,945,742 A | 2/1934 | Hilger |
| 1,973,792 A | 9/1934 | Barrows |
| 1,977,899 A | 10/1934 | Shapiro et al. |
| 2,163,566 A | 6/1939 | Blessin |
| 2,221,005 A | 11/1940 | Reese |
| 2,267,542 A | 12/1941 | Walz |
| 2,371,430 A | 3/1945 | de Patto |
| 2,667,378 A | 1/1954 | Holme-Shaw |
| 3,004,305 A | 10/1961 | Goodemote et al. |
| 3,025,098 A | 3/1962 | Andrews |
| 3,140,115 A | 7/1964 | Bliss |
| 3,266,560 A | 8/1966 | Mooskian |
| 3,312,023 A | 4/1967 | Zell |
| 3,599,596 A | 8/1971 | Remus et al. |
| 3,656,798 A | 4/1972 | Dodgen et al. |
| 3,686,795 A | 8/1972 | La Barge |
| 3,704,563 A | 12/1972 | Waller |
| 3,774,363 A | 11/1973 | Kent |
| 3,824,753 A * | 7/1974 | Anderson ................... 52/203 |
| 3,869,198 A | 3/1975 | Ballentine |
| 3,923,339 A | 12/1975 | McDonald |
| 3,925,947 A | 12/1975 | Meyers et al. |
| 3,959,941 A | 6/1976 | Smith |
| 3,971,178 A | 7/1976 | Mazzoni et al. |
| 4,196,545 A | 4/1980 | Korany et al. |
| 4,205,486 A | 6/1980 | Guarnacci |
| 4,248,018 A | 2/1981 | Casamayor |
| 4,261,649 A | 4/1981 | Richard |
| 4,280,414 A | 7/1981 | Allshouse et al. |
| 4,292,771 A | 10/1981 | Ellis |
| 4,328,644 A | 5/1982 | Scott et al. |

(List continued on next page.)

FOREIGN PATENT DOCUMENTS

| | | |
|---|---|---|
| DE | 2038176 | 9/1971 |
| EP | 106 629 | 4/1984 |
| GB | 715795 | 9/1954 |

Primary Examiner—Carl D. Friedman
Assistant Examiner—Basil Katcheves
(74) Attorney, Agent, or Firm—Knobbe, Martens, Olson & Bear, LLP

(57) ABSTRACT

A window assembly for a mass transit vehicle adapted to receive a transparent protective member to be positioned adjacent an inner surface of a piece of window glazing by a set of retaining brackets that provide rapid removal of the member without having to remove the retaining brackets. The retaining brackets enclose all four edges of the vehicle window glazing and incorporate a defined space between the window glazing an the inner surface of the retaining brackets. The protective member is positioned within the defined space and can be moved between a secured position and a release position.

18 Claims, 3 Drawing Sheets

U.S. PATENT DOCUMENTS

| | | |
|---|---|---|
| 4,331,359 A | 5/1982 | Sheldon |
| 4,332,412 A | 6/1982 | Nakazawa et al. |
| 4,349,993 A | 9/1982 | Tanaka et al. |
| 4,358,488 A | 11/1982 | Dunklin et al. |
| 4,364,209 A | 12/1982 | Gebhard |
| 4,364,595 A | 12/1982 | Morgan et al. |
| 4,430,831 A | 2/1984 | Kemp |
| 4,474,403 A | 10/1984 | Miller |
| 4,478,003 A | 10/1984 | Flett |
| 4,494,342 A | 1/1985 | Decker |
| 4,543,283 A | 9/1985 | Curtze et al. |
| 4,555,867 A | 12/1985 | Stibolt |
| 4,555,869 A | 12/1985 | Kenkel |
| 4,562,666 A | 1/1986 | Young, III |
| 4,663,885 A | 5/1987 | Stibolt |
| 4,673,609 A | 6/1987 | Hill |
| 4,726,149 A | 2/1988 | Tryba |
| 4,763,454 A | 8/1988 | Brockhaus |
| 4,768,823 A | 9/1988 | Martinez |
| 4,823,511 A | 4/1989 | Herliczek et al. |
| 4,940,622 A | 7/1990 | Laevitt, Sr. et al. |
| 4,967,507 A | 11/1990 | Vismic et al. |
| 4,989,912 A | 2/1991 | Furman |
| 4,991,349 A | 2/1991 | Barthelemy |
| 5,002,326 A | 3/1991 | Westfield et al. |
| 5,046,284 A | 9/1991 | Harper |
| 5,050,348 A | 9/1991 | Kane et al. |
| 5,062,248 A | 11/1991 | Kunert |
| 5,081,793 A | 1/1992 | Mauro |
| 5,101,596 A | 4/1992 | Moore |
| 5,150,943 A | 9/1992 | Gold |
| 5,176,420 A | 1/1993 | Kato |
| 5,242,207 A * | 9/1993 | Carson et al. .......... 296/146.15 |
| D350,322 S * | 9/1994 | Carsons et al. ............ D12/183 |
| 5,396,746 A | 3/1995 | Whitmer |
| 5,525,177 A | 6/1996 | Ross |
| 5,546,704 A | 8/1996 | Maruoka |
| 5,570,548 A * | 11/1996 | Hopper ...................... 52/204.5 |
| 5,584,526 A | 12/1996 | Soldner |
| 5,609,938 A | 3/1997 | Shields |
| 5,671,491 A | 9/1997 | Ladd |
| 5,679,435 A | 10/1997 | Andriash |
| 5,735,089 A * | 4/1998 | Smith et al. .................. 52/202 |
| 5,768,837 A | 6/1998 | Sjoholm |
| 5,778,599 A | 7/1998 | Saito |
| 5,809,707 A | 9/1998 | Bargados et al. |
| 5,848,496 A | 12/1998 | Bertolini et al. |
| 5,893,600 A | 4/1999 | McManus |
| 5,907,927 A | 6/1999 | Lieb et al. |
| 6,007,899 A | 12/1999 | Yoshizawa |
| 6,131,339 A | 10/2000 | Ramus |
| 6,205,723 B1 * | 3/2001 | Farrar et al. .................. 52/202 |
| 6,206,453 B1 | 3/2001 | Farrar |

* cited by examiner

SACRIFICIAL SHIELD FOR WINDOW ASSEMBLY

RELATED APPLICATIONS

The present application is a continuation in part application of U.S. patent application Ser. No. 09/395,692 filed Sep. 13, 1999 which is a continuation in part of U.S. patent application Ser. No. 09/186,513, filed Nov. 4, 1998, now U.S. Pat. No. 6,205,723 which are hereby incorporated by reference in their entirety. This application also claims the benefit of U.S. Provisional Application No. 60/244,402, filed Oct. 30, 2000.

BACKGROUND OF THE INVENTION

1. Field of the Invention

The present invention relates to an assembly for positioning a protective member adjacent an inner surface of a piece of glazing of a mass transit vehicle window and, in particular, concerns an assembly that facilitates removal and replacement of the protective sheet.

2. Description of the Related Art

It is well known that public transportation vehicles including motor vehicles, subways systems and trains become a haven for vandals malicious acts. In particular, hoodlums will deface the interior side of vehicle window panes by using knives and other sharp instruments and carving names, inscriptions, and vulgar messages into the glazing of the window resulting in permanent damage to the glazing of the window. Vandalism to these interior windows may also take the form of defacement with magic markers, spray paint and in some extreme cases, puncturing or shattering of the glazing, creating an expensive, time consuming task of window replacement. As a result, the public transportation vehicle will be out of service, incurring lost revenue for the city and limiting the transportation available for the public. For the most part, malicious damage to the interior surface of the window glazing occurs more frequently than damage to the exterior surface of the glazing because the hoodlums can work in a more inconspicuous manner without the public taking notice.

To address this need, various window brackets have been developed to retain and secure a protective sheet of material adjacent the inner surface of the glazing of the vehicle window. In particular, U.S. Pat. No. 5,242,207 to Carson discloses an apparatus that comprises a flexible, transparent sheet of plastic that is secured adjacent the interior side of the window glazing. A fixed bracket mounted along three sides of the vehicle window glazing and a removable bracket along the fourth edge of the window are used to retain the protective sheet of plastic. The removable bracket encloses the fourth edge of the protective sheet of plastic and is attached to the vehicle window frame with a plurality of threaded fasteners.

While the apparatus disclosed in U.S. Pat. No. 5,247,207 adequately protects the interior surface of the window against defacing, the replacement of the protective sheet of plastic can take time. To remove the protective member, first requires the removal of a plurality of threaded fasteners that attach the removable bracket across the fourth edge of the vehicle window glazing. Upon removal of bracket, the protective member is removed and replaced with a new member and the retaining bracket reattached by inserting and tightening the screw fasteners.

Moreover, the repeated removal and insertion of the screw fasteners can ultimately damage the underlying window frame. The window frame is often constructed from soft metal such as aluminum, whereas the threaded fasteners securing the removable bracket are often manufactured from hardened metal. Repeated installation and removal of the fasteners to the window frame can result in the fasteners stripping the window frame such that individual fasteners no longer secure the bracket to the window frame.

Hence, it will be appreciated that there is a continuing need to for a sacrificial protective window system that provides rapid replacement of the sacrificial window panel in a simplified, inexpensive manner. To this end, there is a system of protecting the glazing of windows from damage that is not labor intensive nor result in damage over time to the window frame itself.

SUMMARY OF THE INVENTION

The aforementioned needs are satisfied in one aspect by a glazing protection assembly that includes at least one retainer that attach to the window frame adjacent an inner surface of the glazing, wherein the at least one retainer define at least one space that is adjacent the inner surface of the glazing. The glazing protection assembly also includes a sacrificial member that is positioned adjacent the inner surface of the glazing so that the outer perimeter of the sacrificial member is positioned within the space defined by the at least one retainer such that the at least one retainer retain the sacrificial layer adjacent the inner surface of the piece of glazing. A retaining fastener is also coupled the at least one retainer so as to extend into the space. The retaining fastener is preferably positioned such that it captures the sacrificial member in the at least one space defined by the at least one retainer such that the sacrificial member is inhibited from moving in the at least one space. The sacrificial member is also sized such that when the retaining fastener is removed from the at least one space, the sacrificial member can move within the at least one space so that a perimeter edge of the sacrificial member is removed from the at least one space to thereby permit the sacrificial member to be removed from the at least one retainer. In one particular embodiment, the sacrificial member is comprised of a flexible member such that once the edge is exposed, the sacrificial member can be bent to thereby remove the edge from proximity to the recess to thereby permit removal of the sacrificial member.

In this way, sacrificial members can be removed quickly by removal of the at least one fastener. The fastener is attached to the at least one retainer and, in one embodiment, the at least one retainer is formed of a sufficiently rigid material that repeated removal and replacement of the at least one fastener does not damage the plurality of retainers. In one embodiment, the at least one retainer is comprised of a plurality of retainers that define the at least one space.

Moreover, in one aspect, the at least one retainer is adapted to be retrofitted to an existing window. In particular, the at least one retainer has a retaining edge that is inserted between a gasket and the inner surface of the piece of glazing in an existing window so that the plurality of retainers is retained by the gasket. In this way, existing windows can be retrofitted with a security device without requiring the use of tools and the like. In one particular embodiment, the at least one retainer has interlocking ends to inhibit unauthorized removal.

These and other objects and advantages of the present invention will become more fully apparent from the following description taken in conjunction with the accompanying drawings.

DETAILED DESCRIPTION OF THE PREFERRED EMBODIMENTS

Figure 1:
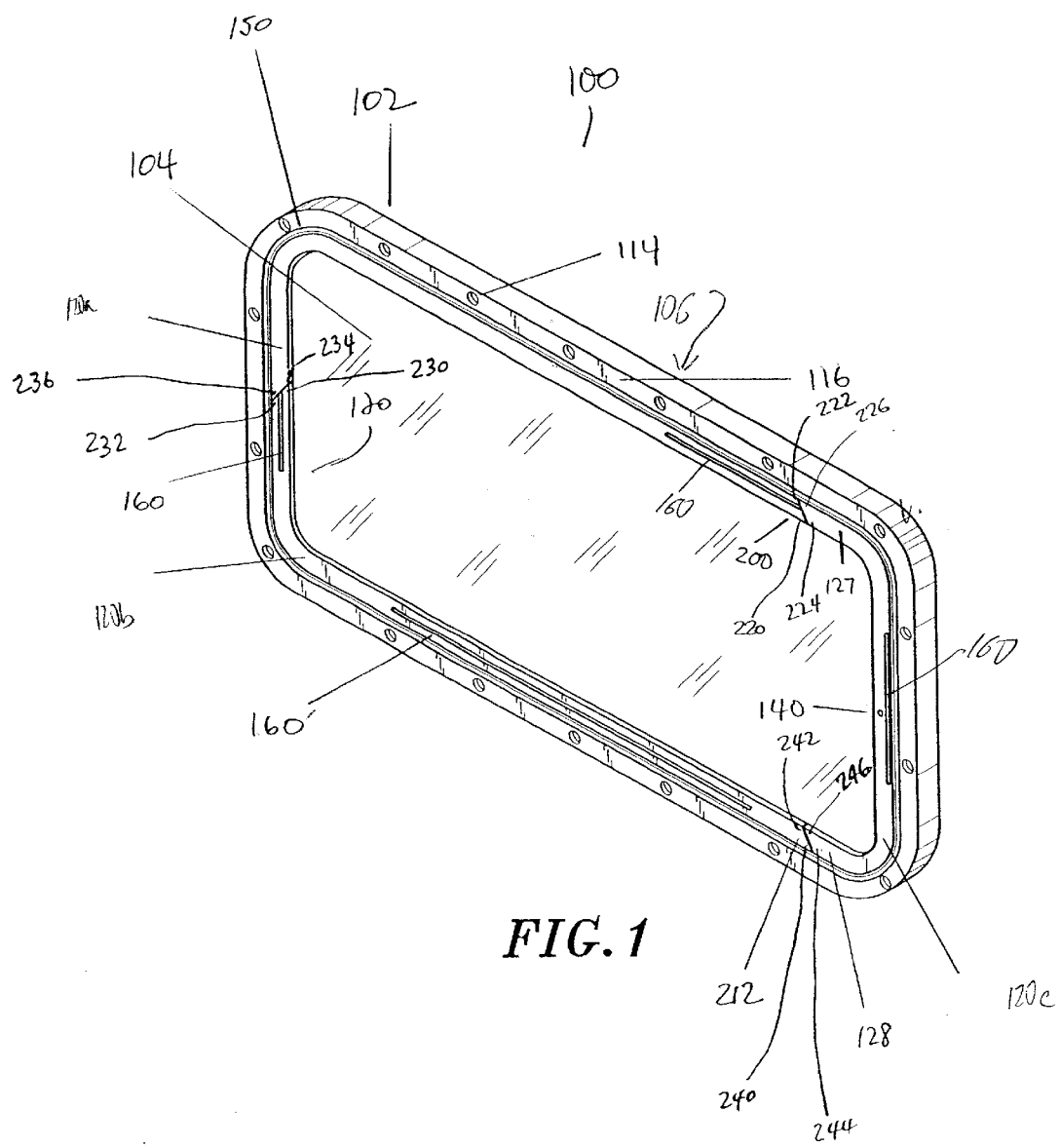
FIG. 1 is a perspective view of one embodiment of an assembled sacrificial window assembly of the present invention.
Figure 2:
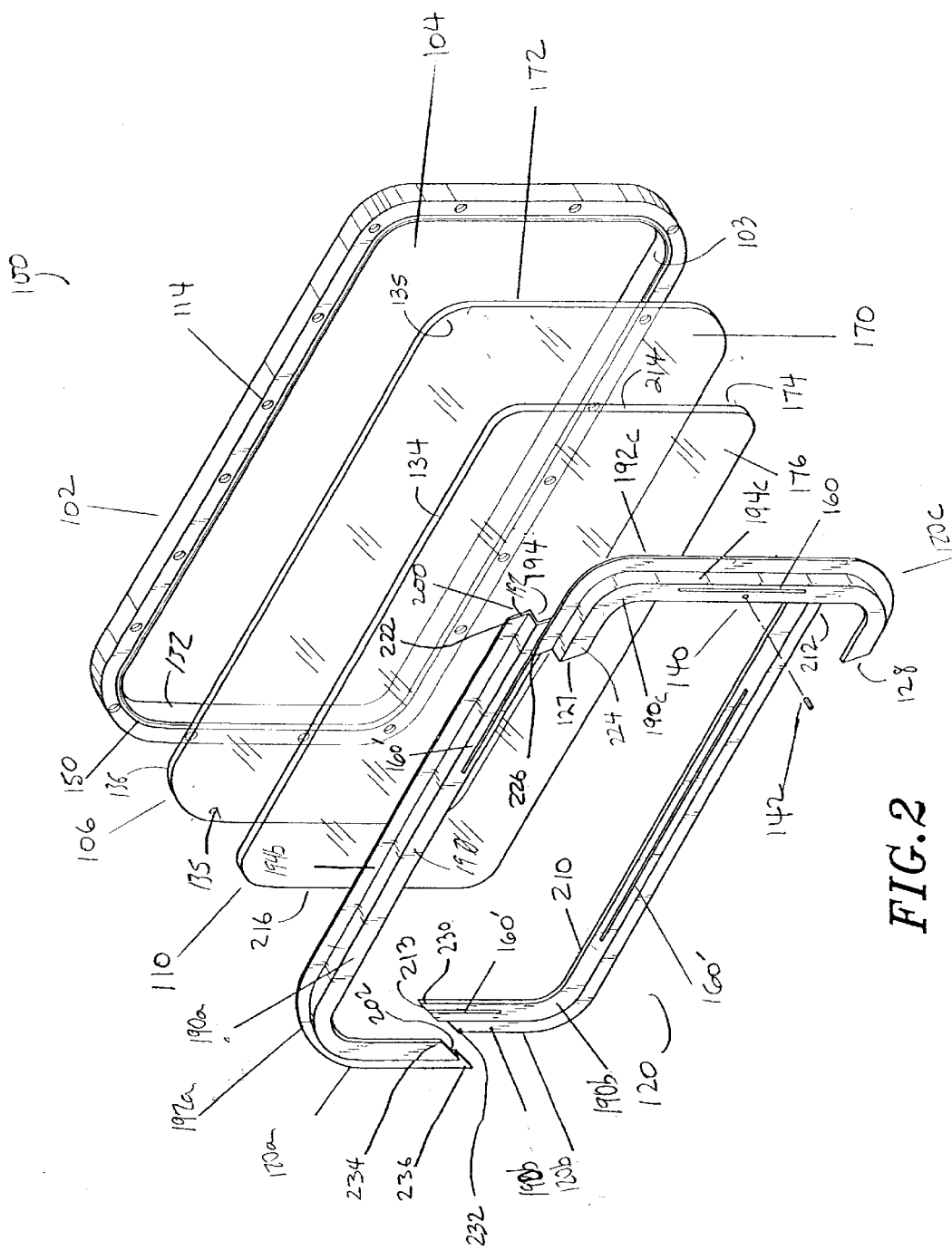
FIG. 2 is an exploded view of the sacrificial window assembly of FIG. 1.
Figure 3:
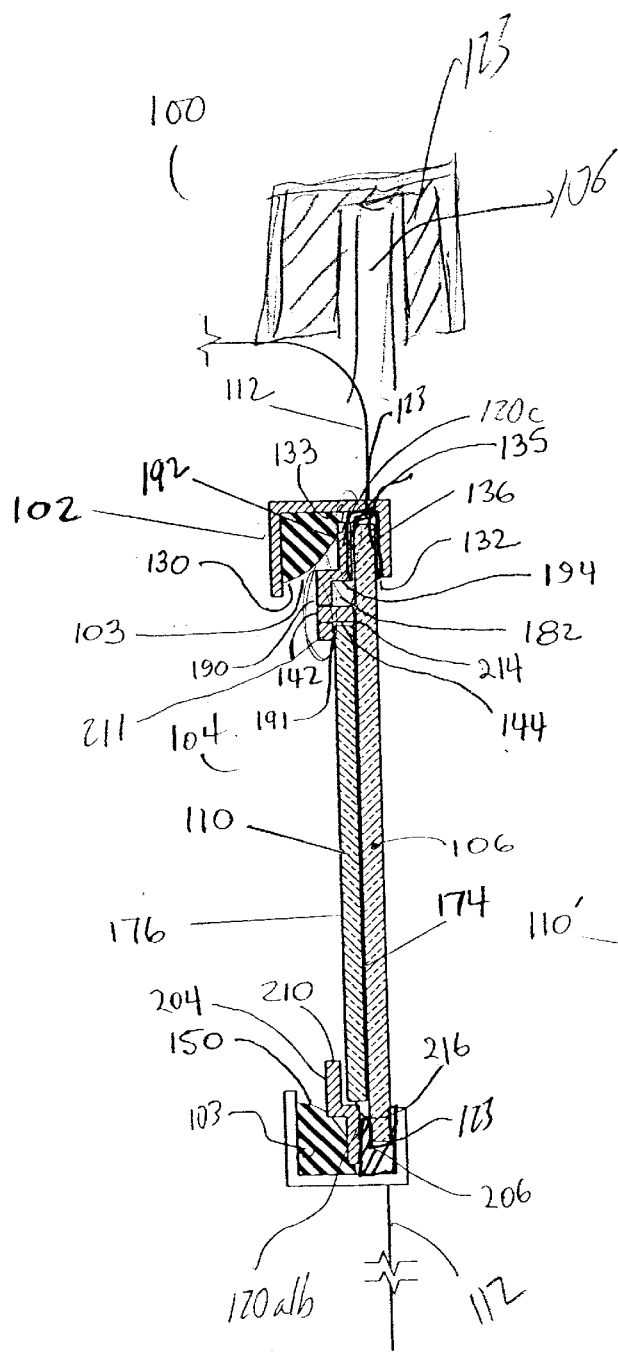
FIG. 3 is a side, cross-sectional view of the sacrificial window assembly of FIG. 1.
Figure 4:
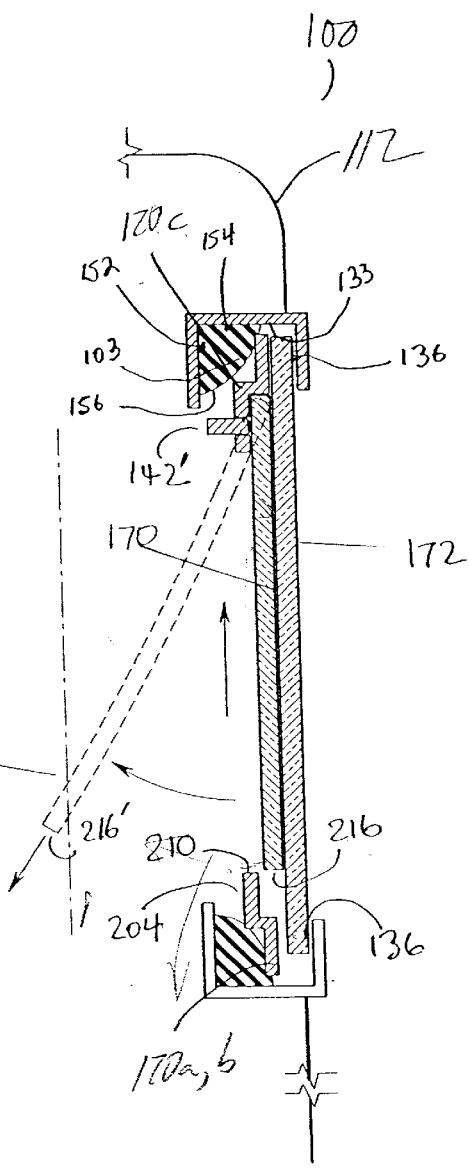
FIG. 4 is a side, cross-sectional view of the sacrificial window, assembly of FIG. 1 illustrating the manner in which the sacrificial window member is removed for rapid replacement.

Reference will now be made to the drawings wherein like numerals refer to like parts throughout. Referring to FIGS. 1,2 and 3, the component members of a quick release sacrificial shield assembly 100 for a public transportation vehicle of the preferred embodiment is illustrated in a fully assembled state. An original equipment vehicle window frame 102 is fitted into a rectangular opening of the vehicle wall 112 (FIGS. 3 and 4). The vehicle window frame 102 is attached to the walls of the interior sidewall 112 of the vehicle with a plurality of threaded fasteners (not shown) that screw through a plurality of small openings 114 positioned along a first outer surface edge 116 of the vehicle window frame 102. The threaded fasteners for the most part will not require removal unless the window frame becomes damaged and requires replacement.

The window frame 102 of FIG. 1 defines an opening 104 that is generally rectangular in this embodiment and is adapted to receive a vehicle window glazing 106 and a sacrificial member 110 which is used to protect the window glazing 106 against vandalism. The vehicle window frame 102 has a U-shaped cross-section (FIGS. 3 and 4) that defines an interior channel 103 into which a rubber gasket 150, the window glazing 106 and a plurality of retaining brackets 120 can be positioned in a manner that will be described in greater detail hereinbelow.

FIG. 1 also illustrates the plurality of retaining brackets 120 which comprise a first L-shaped retainer 120a, a second L-shaped retainer 120b and a C-shaped retainer 120c (see exploded view of FIG. 2). The plurality of retaining brackets 120 are positioned between the gasket 150 and the glazing 106 and serve to retain the sacrificial member 110 in a secure fashion adjacent the vehicle window glazing 106 and will be discussed in greater detail below. A first opening 140 through the C-shaped retainer 120c is also illustrated in FIG. 1 and it accommodates a retaining fastener 142 (FIG. 2) which is used to inhibit the movement of the sacrificial member 110 within the fixed boundaries of the plurality of retaining brackets 120, as will be described below in connection with FIGS. 3 and 4.

As is also illustrated in FIGS. 1 and 2, a plurality of elongate slots 160 are positioned longitudinally along the surface of each retainer 120a–120c, respectively. The plurality of elongate slots 160 are used for both installing and removing the retaining brackets 120 from between the rubber gasket 150 and the inner perimeter edge 135 of the window glazing 106, which will be described in detail below.

FIG. 2 illustrates the individual component members of the quick release sacrificial shield assembly 100 in an exploded view. The vehicle window frame 102 receives the vehicle window glazing 106 within the rectangular opening 104 so that the outer perimeter 136 of the glazing 106 is positioned substantially adjacent an outer edge 132 of the U-shaped vehicle window frame 102. Further, the window glazing 106 is retained against the outer frame edge 132 by the rubber gasket 150. In particular, the rubber gasket 150 maintains a constant force against an inner perimeter edge 135 of the first surface 170 of the window glazing 106 keeping the window glazing 106 firmly positioned against the second frame edge 132 of the window frame 102 in a manner that is further illustrated and described in connection with FIGS. 3 and 4.

As is illustrated in FIG. 3, the glazing 106 can be positioned within a U-shaped gasket 123 so as to protect the edges of the glazing 106 from damage by contact with the frame members. The U-shaped gasket can also be integrally attached to the gaskets 150, 152 and permit the insertion of the retainers 120 in the previously described manner without departing from the spirit of the present invention.

The vehicle window glazing 106 has a first surface 170 facing the interior of the vehicle and the second surface 172 facing the exterior of the vehicle, and is the protected component of the quick release sacrificial shield assembly 100. Specifically, the replacement costs of labor and material associated with the replacement of the window glazing 106 could be expensive, thereby dictating a need for a quick release sacrificial window assembly 100.

The sacrificial member 10 that is positioned adjacent the inner side 170 of the vehicle window glazing 106 is also illustrated in FIG. 2. The sacrificial member 110 is transparent and has substantially the same or smaller dimensions as the vehicle window glazing 106. The sacrificial member 110 is preferably manufactured from acrylic which provides a certain degree of flexibility for the ease of installation and removal from the retaining brackets 120 that enclose the periphery edge 134 of the sacrificial member 110. In addition, the sacrificial member 110 must be physically robust so as to protect the window glazing 106 against vandalism. The sacrificial member 110 has a first side 174 facing the inside of the window glazing 106 and a second side 176 facing the interior of the vehicle. In particular, the sacrificial member 110 is positioned adjacent the first surface 170 of the window glazing 106.

As can also be seen in FIG. 2, the plurality of retaining brackets 120 are comprised of the first L-shaped retainer 120a, the second L-shaped retainer 120b and the C-shaped retainer 120c that in combination provide a one piece member that encloses the periphery edge 134 of the sacrificial member 110. It will be appreciated that the exact configuration of the retaining brackets 120 can vary and can comprise even a single bracket without departing from the spirit of the present invention. The plurality of retaining brackets 120 have a Z-shaped cross section and, in particular, each of the retainers 120a–120c has a retaining leg 190 and a securing leg 192. The retaining leg 190 and the securing leg 192 are generally parallel to the plane of the sacrificial member 110, but offset from each other in a direction normal to the plane of the sacrificial member 110. In particular, the retaining leg 190 and the securing leg 192 are interconnected by an interconnecting section 194 which is perpendicular to the retaining leg 190 and the securing leg 192. The interconnecting section 194 is spaced to accommodate the width of the sacrificial member 110. Hence, the plurality of retaining brackets 120 with the interconnecting sections 194 are advantageously positioned within the interior channel 103 of the window frame 102 to retain and enclose the periphery edge 134 of the sacrificial member 10 in the manner that will be described in greater detail hereinbelow.

FIG. 2 also illustrates the manner in which a first and a second end of each of the plurality of retaining brackets 120a–120c engage with each other in an interlocking, diagonal pattern within the defined space of the inner channel 103 of the window frame 102. In particular, the first L-shaped retainer 120a has a first end 200 that abuts a second end 127 of the C-shaped retainer 120c, and a first end 128 of the C-shaped retainer 120c abuts a second end 212 of the second L-shaped retainer 120b. Further, a first end 213 of the second L-shaped retainer 120b abuts a second end 202 of the first L-shaped retainer 120a.

Moreover, the first ends 200, 128, 213 of the plurality of retaining brackets 120a–120c have a first configuration, and the second ends 127, 212, 202 of the plurality of retaining brackets 120a–120c have a second configuration. Specifically, the retaining brackets 120 are formed so as to define a diagonal end such that an inner point 220 (FIG. 1) on the first end 200 of the first L-shaped retainer 120a is located laterally outward from an outer point 222 on the first end 200 of the first L-shaped retainer 120a. The first and second ends 213,212 of the second L-shaped retainer 120b also have a first configuration. A mating pattern of a second configuration is formed on the second and first ends 127, 128 of the C-shaped retainer 120c and also on the second end 202 of the first L-shaped retainer 120a. In particular, an inner point 224 of the second end 127 of the C-shaped retainer 120c is located laterally inward from an outer point 226 on the second end 127 of the C-shaped retainer 120c (seen in both FIGS. 1 and 2). The first end 128 of the C-shaped retainer 120c and the second end 202 of the first L-shaped retainer 120a also have a second configuration.

It will be appreciated that the first ends of the retaining brackets 120 inhibit the inward movement of the second ends of the retaining brackets 120 respectively. In particular, the plurality of retainers 120a–120c are configured so that there is an overlapping inward edge overlapping each end of each of the retainers 120. Hence, inward movement of the retainers 120 away from the window frame 102 is opposed due to the interaction between adjacent retainers 120. In this way, the plurality of the combined retaining brackets 120, engage a single bracket that will fixedly be positioned within the inner channel 103 of the window frame 102. The interlocking configuration of the retaining brackets 120 provide a method to secure the retaining brackets 120 within the interior channel 103 of the window frame 102 without the need to attach external bracket members to the window frame 102 or interior wall 112 of the vehicle with exposed screw fasteners, that could damage the window frame.

It will also be appreciated that the sacrificial layer 10 also inhibits the removal of the retainers 120a–102c. In particular, when the sacrificial layer 110 is positioned within the recess defined by the retainers, the retainers are inhibited from moving inward towards the center of the window opening. Thus, the presence of the sacrificial layer 110 inhibits removal of the retainers 120a–120c. Consequently, the sacrificial layer 110 must preferably be removed prior to removal of the retainers 120a–120c. However, to inhibit unauthorized removal, the sacrificial layer 110 is captured in the recess defined by the retainers in the manner that will be described in greater detail hereinbelow. While the previous illustrated embodiment has illustrated the retainer 120 as being comprised of a plurality of mating retainer pieces 120a–120c, it will also be appreciated that a single retainer 120 can be inserted in the previously described manner and used to retain the sacrificial member 110 without departing from the spirit of the present invention.

A retaining fastener 142 is shown in FIG. 2 with a phantom line illustrating that the retaining fastener 142 advantageously extends through a first opening 140 of the retaining leg 190 of the C-shaped retainer 120c. With the retaining fastener 142 fully threaded into the first opening 140 of the C-shaped retainer 126, the retaining fastener 142 will be positioned within a space defined by the plurality of retainers 120a–102c.

Referring now to FIGS. 3 and 4, a cross-sectional view of the quick release sacrificial window assembly 100 with the sacrificial window member 110, the vehicle window glazing 106 and the plurality of retaining brackets 120a–120c are illustrated as being positioned within a channel 103 defined by the window frame 102. In particular, the Z-shaped cross section of the C-shaped retainer 120c is shown such that the securing leg 192 is forcibly positioned between the rubber gasket 150 and the first surface 170 of the vehicle window glazing 106.

As is illustrated in FIGS. 3 and 4, the gasket 150 exerts a force against the plurality of retainers 120a–120c so as to urge the plurality of retainers 120a–102c against the inner surface 170 of the glazing 106. Hence, the plurality of retainers 120 are retained in the window frame 102 by the combination of the force exerted by the gasket 150 and the interlocking of the ends of the retainers 120a–120c described previously. Preferably, a tool is used to urge the retainers 120a–120c into position by hammering against the elongate slots 160 of the retainers 122, 124 so as to urge the securing leg 192 of each of the retainers between the rubber gasket 150 and the inner surface 170 of the window glazing 106.

As is also illustrated in FIG. 3, when the securing leg 192 is positioned between the gasket 150 and the inner surface 170 of the glazing 106, the retaining leg 190 is positioned outward from the inner surface 170 of the glazing 106 so as to define a space 182 that extends about the entire perimeter of the piece of glazing 106.

Preferably, the sacrificial member 110 is positioned such that both a first and second edge 214, 216 are positioned within the space 182 so as to retain the sacrificial member 110 in proximity to the first surface 170 of the glazing 106.

In particular, the first end 214 is positioned immediately adjacent the outer edge 211 of the retainer 120c immediately adjacent the retaining fastener 142 such that the outer edge 211 overlaps the outer perimeter 214 and is retained in the space 182 by the retainer 120c as is illustrated in FIG. 3. However, the retaining fastener 142 extends into the space 182 so as to abut the outer perimeter 214 of the sacrificial member 110 to thereby prevent the sacrificial member 110 from moving in the space 182. In this way, the first and second edges 214, 216 of the sacrificial member 110 are retained in the space 182 defined by the plurality of retainers 120a–120c and the sacrificial member 110 is thus secured adjacent the inner surface 170 of the glazing 106. The sacrificial member 110 can thus inhibit damage to the inner surface 170 of the glazing by vandals and the like.

However, as is illustrated in FIG. 4, once the retaining fastener 142 is removed, the sacrificial member 110 can be slidably moved within the space 182. In particular, the edge 214 can be slid towards the interconnecting section 194 of the retainer 120c. As is illustrated in FIG. 4, the sacrificial member 110 is preferably sized so that when the first edge 214 is positioned adjacent the interconnecting section 194 of the retainer 126, the second edge 216 is position out of the space 182 defined by the retainers 122, 124 in the manner shown in FIG. 4. In this way, the sacrificial member 110 can be removed from the space 182 thereby permitting replacement.

In particular, the sacrificial member 110 is preferably made of a relatively flexible material so as to permit bending of the sacrificial member 110. The retaining fastener 142 is preferably positioned within the retainer 120 so as to inhibit movement of the sacrificial member 110. However, upon removing the retaining fastener 142, the sacrificial member 110 can be moved so as to expose the edge 216. This permits the sacrificial member 110 to be removed in the manner shown in FIG. 4 in phantom thereby permitting the sacrificial member 110 to be removed from adjacent the first surface 170 of the glazing 106. The sacrificial member 110 is preferably flexible such that it can also be bent from side to side. Each of the side edges of the sacrificial member 110 is also captured within the recesses defined by the retainers 120a–120c. Hence, once the edge 216 is exposed, the center of the edge 216 can be pulled out thereby laterally bending the sacrificial member 110 which reduces the width of the sacrificial member and permits its removal from the edges of the side retainers as well.

A replacement sheet of sacrificial member 110' can then be installed by positioning a first edge 214' of the replacement sheet 110' into the space occupied by the retaining fastener 142 and then positioning the second edge 216' adjacent the retainer 120. The replacement sheet 110' is then moved downward and the fastener 142 is re-secured thereby securing the replacement sacrificial member 110' adjacent the inner surface 170 of the glazing 106 in the previously described manner.

It will be appreciated from the foregoing description that the assembly 100 allows for very quick and efficient removal and replacement of the sacrificial sheets. Only a single fastener need to be displaced and the sacrificial sheet can then be pulled out. Moreover, retainers can be mounted in the window frame without requiring the use of fasteners to secure the retainers to the window frame. Hence, damage to the window frame is also reduced.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof may be made by those skilled in the art without departing from the spirit of the present invention.

What is claimed is:

1. A window assembly for a mass transit vehicle, the assembly comprising:

a window frame having a plurality of sides wherein the window frame defines an aperture and wherein the window frame further defines a channel formed on each of the plurality of sides;

a piece of glazing having an inner surface, an outer surface and an outer perimeter that define at least two opposed sides wherein the piece of glazing is positioned within the aperture of the window frame such that the outer perimeter of the piece of glazing is positioned within the channels:

a plurality of retainers positioned within the aperture of the window frame so as to be positioned adjacent the at least two opposed sides of the piece of glazing, wherein the plurality of retainers are configured to define a space adjacent the inner surface of the at least two opposed sides of the piece of glazing wherein the space is located adjacent the outer perimeter of the piece of glazing;

a sacrificial member having an outer perimeter wherein the sacrificial member is positioned adjacent the inner surface of the piece of glazing so as to protect the inner surface of the piece of glazing with the outer perimeter of the sacrificial member being positioned within the space defined by the. plurality of retainers wherein the retainers positioned adjacent the at least two opposed sides of the piece of glazing are positioned and the sacrificial member is sized so as to be movable within the space in a direction that is substantially parallel to the plane of the piece of glazing between a secured position wherein the at least two opposed edges of the sacrificial member are positioned within the spaces defined by the retainers so as to inhibit removal of the sacrificial member and a release position and wherein one edge of the sacrificial member is exposed from the space so as to permit the sacrificial member to be bent outward in a direction having a component perpendicular to the plane of the glazing past the retainers to thereby be removed when the sacrificial member is in the release position; and a retaining fastener that extends through one of the plurality of retainers so as to inhibit movement of the sacrificial member between the secured and release position.

2. The assembly of claim 1, further comprising a gasket positioned within the channels so as to exert force against the outer perimeter of the piece of glazing so as to retain the piece of glazing within the aperture of the window frame.

3. The assembly of claim 2, wherein the plurality of retainers are positioned within the channel so that at least a portion of the plurality of retainers are interposed between the gasket and the inner surface of the piece of glazing to thereby be retained in the channels.

4. The assembly of claim 3, wherein each of the plurality of retainers include a securing leg, a retaining leg and an interconnecting section coupling the securing leg to the retaining leg wherein the securing leg and the retaining leg are substantially parallel to each other and the interconnecting section is substantially perpendicular to the plane of the securing leg and the retaining leg.

5. The assembly of claim 4, wherein the securing leg of the plurality of retainers is interposed between the gasket and the inner surface of the glazing such that the retaining leg of the plurality of retainers defines the space in which the sacrificial member is positioned.

6. The assembly of claim 5, wherein the retaining fastener is positioned on the retaining leg so as to extend through the retaining leg such that the retaining fastener can be positioned in the space defined by the retaining leg of the first one of the plurality of retainers.

7. The assembly of claim 3, wherein each of the plurality of retainers have a first and a second end wherein the first end engages with a second end of an adjacent retainer such that the interaction of the first and second ends of the plurality of retainers inhibit inward movement of the plurality of retainers from the channels defined by the window frame into the aperture.

8. The assembly of claim 7, wherein a first end of each of the retainers has a first configuration and the second ends of each of the retainers has a second configuration such that the first ends inhibit inward movement of the second ends of the adjacent retainers.

9. The assembly of claim 8, wherein the first ends of the plurality of retainers are formed so as define a diagonal end such that an inner point of the first end of the plurality of retainers is located laterally outward from an outer point on the first end of the plurality of retainers and wherein the second ends of the plurality of retainers are formed so as to define a diagonal end such that an inner point of the second end of the plurality of retainers is located laterally inward from an outer point on the second end of the plurality of retainers.

10. An assembly for retrofitting existing mass transportation vehicle window, that have a piece of glazing retained within a channel by a gasket, with a sacrificial protective layer, the assembly comprising:

at least one retainer that is interposed between the gasket and the piece of glazing, wherein the at least one retainer is positioned on opposite sides of the piece of glazing and wherein the at least one retainer defines a space adjacent the outer perimeter of the piece of glazing when interposed between the gasket and the piece of glazing;

a sacrificial member having an outer perimeter that is positioned adjacent the inner surface of the piece of glazing when the at least one retainer is interposed between the gasket and the piece of glazing, wherein at least a portion of the outer perimeter of the sacrificial member is positioned within the space defined by the at least one retainer such that the at least one retainer retains the sacrificial member adjacent the piece of glazing and wherein the sacrificial member is sized so as to be movable in a direction substantially parallel to the plane of the glazing between a secured position and a release position in the space and wherein an outer edge of the sacrificial member is removed out of the space when the sacrificial member is in the release position so as to permit removal of the sacrificial member; and wherein the at least one retainer is configurable into a secured configuration such that movement of the sacrificial member between the secured and release position is inhibited wherein the at least one retainer is further configurable into a release configuration allowing the sacrificial member to move into the release position and be removed from the window without requiring removal of any of the at least one retainer.

11. The assembly of claim 10, wherein the at least one retainer comprises a plurality of retainers that extend about substantially the entire perimeter of the window frame.

12. The assembly of claim 11, wherein each of the plurality of retainers include a securing leg, a retaining leg and an interconnecting section coupling the securing leg to the retaining leg wherein the securing leg and the retaining leg are substantially parallel to each other and the interconnection section is substantially perpendicular to the plane of the securing leg and the retaining leg.

13. The assembly of claim 12, wherein the one of the plurality of retainers includes a retaining fastener that extends therethrough into the space such that the retaining fastener can be positioned into a secured position which inhibits movement of the sacrificial member in the space and a release position wherein the sacrificial member can be moved to the release position and removed from the window.

14. The assembly of claim 12, wherein each of the plurality of retainers have a first and a second end such that the first end engages with the second end of an adjacent retainer such that the interaction of the first and second ends of the plurality of retainers inhibit inward movement of the plurality of retainers from the channels defined by the window frame.

15. The assembly of claim 14, wherein a first end of each of the retainers has a first configuration and the second ends of each of the retainers has a second configuration such that the first ends inhibit inward movement of the second ends of the adjacent retainers.

16. The assembly of claim 15, wherein the first ends of the plurality of retainers are formed so as to define a diagonal end such that an inner point of the first end of the plurality of retainers is located laterally outward from an outer point on the first end of the plurality of retainers and wherein the second end of the plurality of retainers are formed so as to define a diagonal end such that an inner point of the second end of the plurality of retainers is located laterally inward from an outer point on the second end of the plurality of retainers.

17. The assembly of claim 10, wherein the sacrificial member is comprised of a planar sheet of material and is sized so as to cover the inner surface of the glazing.

18. The assembly of claim 10, wherein the at least one retainer comprises a single continuous retainer.

* * * * *